Figure 1:
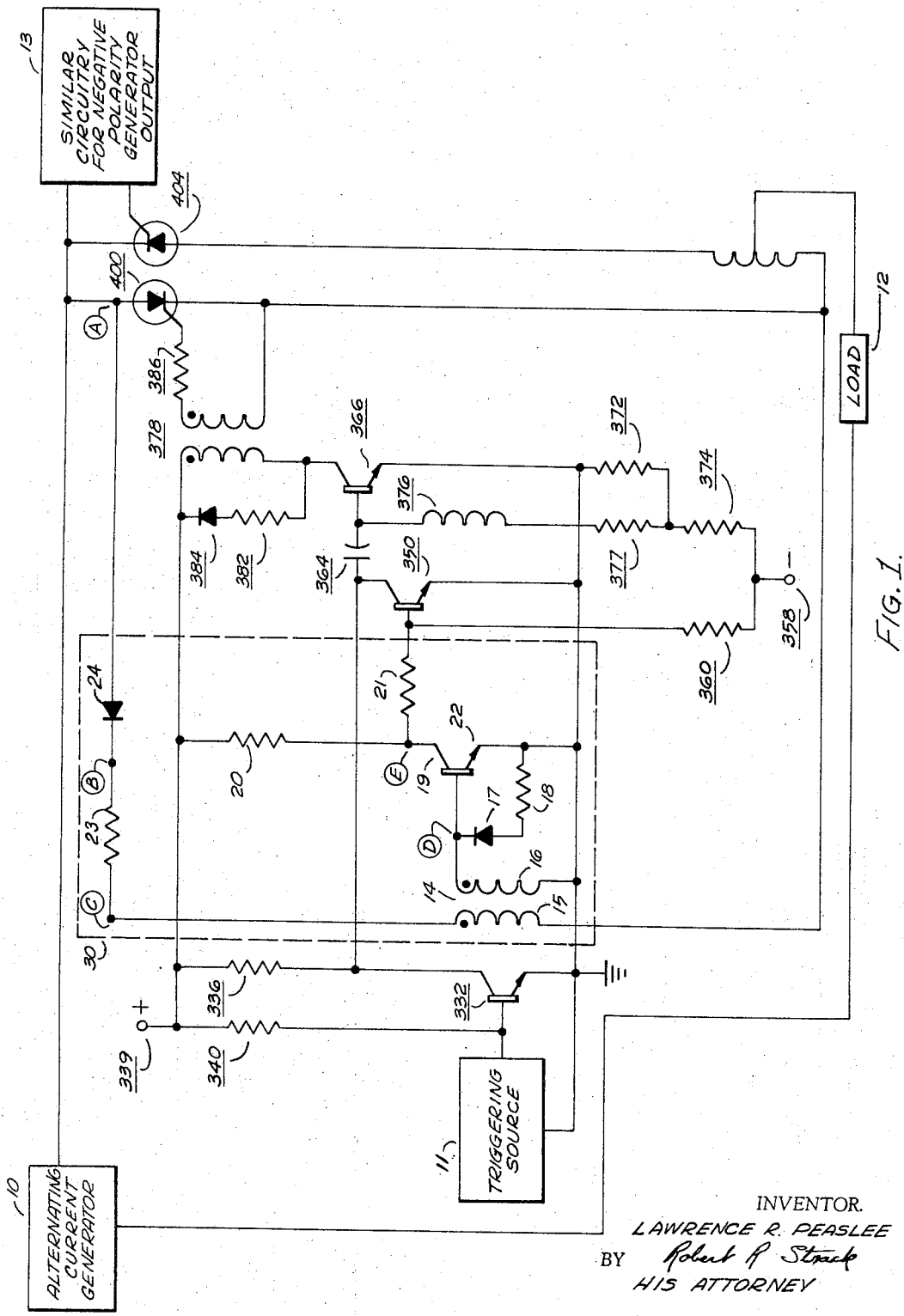

Oct. 31, 1967 L. R. PEASLEE 3,350,568
VOLTAGE SENSING AND CONTROL CIRCUITS
Filed April 3, 1963 2 Sheets-Sheet 1

INVENTOR.
LAWRENCE R. PEASLEE
BY Robert A. Strack
HIS ATTORNEY

United States Patent Office 3,350,568
Patented Oct. 31, 1967

3,350,568
VOLTAGE SENSING AND CONTROL CIRCUITS
Lawrence R. Peaslee, Waynesboro, Va., assignor to General Electric Company, a corporation of New York
Filed Apr. 3, 1963, Ser. No. 270,286
1 Claim. (Cl. 307—88.5)

This invention relates to control circuitry, and more particularly, it relates to control circuitry for sensing the occurrence of particular voltage transitions.

In connection with the multitude of applications wherein electrical signals are employed to represent the instantaneous condition of continuously varying parameters, it is often necessary to precisely detect the instant of time at which the varying parameters attain or go through a predetermined value. The varying parameters very often include changing physical characteristics of mechanical and chemical processes; however, ultimately, it is common to express the changing parameters in the form of a voltage which varies in accordance therewith. Once this representative varying voltage is developed, the detection of a particular parameter resolves itself to the detection of when the representative voltage attains or passes the particular voltage level representing that parameter. The chore of detecting such a discrete voltage condition is complicated when the representative wave shape is of an asymmetrical nature having unequal volt-seconds on opposite sides of a predetermined voltage magnitude.

It is an object of the present invention to provide means for sensing the instant at which a continuously varying voltage passes a predetermined value and to generate a discrete signal in response thereto.

Another object of the present invention is to provide a circuit for detecting and indicating the polarity of an asymmetrical alternating voltage.

The particular problem of detecting when a voltage reverses polarity is often encountered in control circuits operative in conjunction with voltage generating equipment. Specifically, in the operation of controlled rectifiers, wherein the rectifiers are employed as power control devices for establishing the amount of power delivered from a generating source to a load, it is important to know when the controlled rectifiers are in a suitable condition for triggering. As well known, controlled rectifiers are unidirectional conducting elements which may be triggered into conduction when a positive voltage relationship exists between their anode and cathode terminals. An attempt to trigger these devices when this voltage relationship is not present will be ineffectual.

Another object of the present invention is to provide a circuit for monitoring the voltage across an electrical component and to generate a signal when said voltage reverses polarity sense.

Still another object of the present invention is to provide a unique circuit for sensing the instant at which the voltage across a controlled rectifier is of the appropriate polarity to permit effective triggering and generate an enabling signal during the ensuing duration of said polarity condition.

The invention described hereinafter comprises unique means for sensing the instant of voltage reversal across a controlled rectifier. This unique means comprises a single transistor that is coupled to the anode and cathode terminals of the controlled rectifier by means of an isolating transformer. The circuit permits the establishment of a discrete signal condition with respect to ground without distrubing the floating condition of the controlled rectifier terminals. The particular embodiment described contemplates the use of controlled rectifiers for controlling the power delivered from a generator to a load; however, it will be obvious to those skilled in the art that the means used for detecting voltage reversal may be employed in other applications without departing from the inventive concepts disclosed herein.

Figure 2:
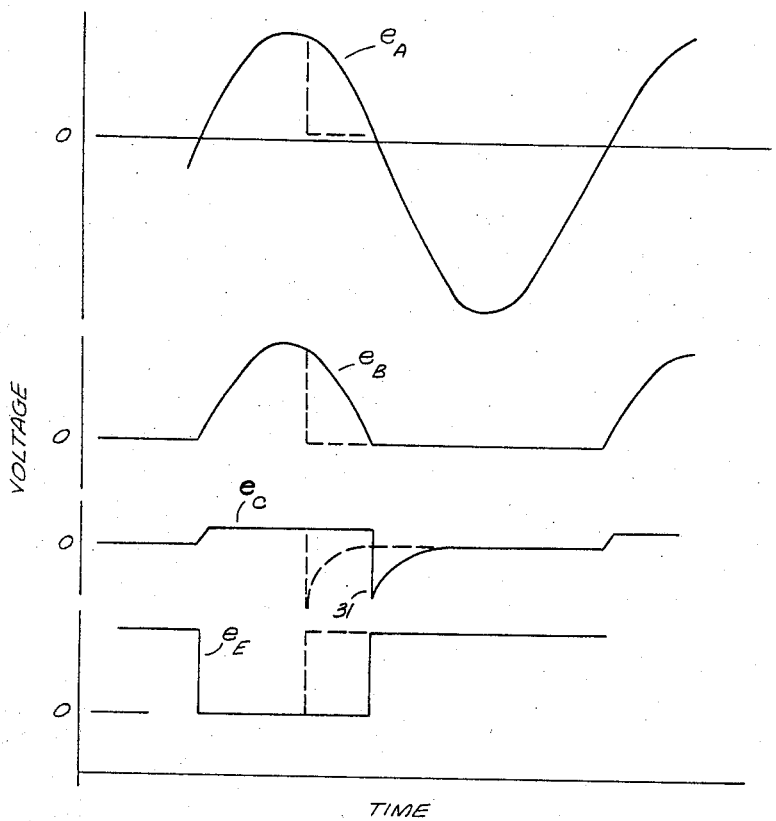

The novel features which are believed to be characteristic of the invention are set forth with particularity in the appended claims. The invention itself, however, both as to its organization and method of operation, together with further advantages thereof, may best be understood by reference to the following description taken in conjunction with the accompanying drawing wherein:

FIGURE 1 is a circuit schematic illustrating the operation of the invention in conjunction with a typical controlled rectifier triggering circuit; and FIGURE 2 comprises a plurality of instantaneous voltage waveforms typically present at significant points in the circuit of the invention.

For convenience and brevity of description, the circuit of the invention has been illustrated in cooperation with the frequency converter system disclosed in the co-pending patent application of L. R. Peaslee, Ser. No. 129,646, filed Aug. 7, 1961, issued Oct. 6, 1964, as U.S. Patent 3,152,297, now reissue application Ser. No. 559,031, and assigned to the General Electric Company, assignee of the present invention. Reference may be made to this application for a complete description of the operating of the circuitry shown therein. Where components in FIGURE 1 correspond to similar components in the cited application, identical numerical designations have been employed. These designations are distinguished in FIGURE 1 by underlining.

In general, the system depicted in FIGURE 1 includes an alternating current generator 10 operative to supply power via controlled rectifiers 400 and 404 to a load 12. The controlled rectifiers are selectively rendered conductive in accordance with desired conditions under the control of a triggering source 11 which is also responsive to the alternating current generator 10. It should be understood that the circuitry illustrated may be taken as representative of the controls associated with a single phase of a multiphase generator such as that shown in the above cited patent application. Triggering source 11 may be of any construction adapted to furnish discrete negative pulses to normally conducting transistor 332 in accordance with predetermined conditions. Such a triggering source is shown, for example, by the multiple inputs to transistor 332 in the cited application.

The unique circuitry of the present invention is illustrated within dashed lines 30 of FIGURE 1. It comprises an NPN transistor 22 having its collector connected via a resistor 20 to a positive potential source 339 and its emitter directly connected to ground. Enabling signals are applied to transistor 22 by means of a linear transformer 14 having its secondary winding 16 interconnected between the base and emitter thereof. As described hereinafter, the primary 15 of this transformer is energized when a positive potential appears between the anode and cathode of controlled rectifier 400, by means of a circuit comprising suitably oriented rectifier 24 and a large resistor 23. Additional components within dashed box 30 include a limiting circuit consisting of a rectifier 17 and resistor 18 serially connected between the base and emitter of transistor 22, and an output resistor 21 adapted to transmit the voltage appearing at the collector of transistor 22 to the base of succeeding transistor 350.

The voltage sensing circuit is essentially a bistate arrangement providing a positive voltage level at the collector of transistor 22 during the period that a negative polarity appears between the anode and cathode terminals of controlled rectifier 400. When a positive potential appears thereacross, a zero voltage level is presented at the collector of transistor 22.

By means of the circuit shown, a completely isolated control element for sensing the voltage polarity across controlled rectifier 400 is illustrated. This control precisely detects the polarity across the floating terminals of the controlled rectifier and furnishes the necessary indicia to insure reliable operation of the firing control circuitry which comprises transistors 332, 350, and 366.

Aside from the control circuit enclosed within dashed lines 30, the circuit of FIGURE 1 comprises two switching transistors 332 and 350, and a third transistor 366 operative in conjunction with a feedback winding 376 and a transformer 378 to form a blocking oscillator.

Transistor 332 is of the NPN variety and is connected in a circuit whereby in the quiescent state, the base is positive with respect to the emitter electrode and consequently, it conducts at saturation. The circuit components associated with this transistor include a resistor 340 connected between the base electrode and positive potential source 339, a resistor 336 connected between the collector electrode and positive potential source 339, and a conductor connected between the emitter electrode and ground. Triggering source 11 is adapted to provide a negative signal when controlled rectifier 400 is to be rendered conductive. In response to such a signal, transistor 332 is rendered nonconductive and its collector electrode assumes a potential substantially equivalent to that of the positive source 339.

The emitter of the blocking oscillator transistor 366, is connected to ground and the base is connected via a feedback winding 376 and a resistor 377 to a point negative with respect to ground, which is established at the junction point between a pair of resistors 372 and 374; the latter pair of resistors being interconnected between a negative source 358 and ground. The collector of transistor 366 is connected to positive voltage source 339 via the parallel combination of the primary winding of transformer 378 and the series arrangement of a resistor 382 and the anode to cathode path of a rectifier 384. The secondary winding of transformer 378 is serially connected with a resistor 386 between the gate and cathode terminals of controlled rectifier 400 and consequently, each time transistor 366 is rendered conductive, a positive gating pulse is applied to the controlled rectifier. It should be noted that the standard dot notation has been employed to indicate the orientation of the windings of transformer 378.

Barring the intervening operation of transistors 22 and 350, each time a negative triggering signal is generated by triggering source 11, transistor 332 is rendered nonconductive and the ensuing positive potential at the collector thereof is operative via capacitor 364 to initiate blocking oscillator operation and the application of a triggering impulse to controlled rectifier 400. The inclusion of capacitor 364 provides short duration pulses for triggering transistor 366 and diode 384 is employed across the primary winding of the blocking oscillator transformer 378 in order to provide transient suppression so that an inductive surge will not cause the voltage at the collector of transistor 366 to exceed a breakdown level.

The prime purpose of the voltage sensing circuit of the invention is to prevent triggering when the voltage across controlled rectifier 400 is of the wrong polarity. This is governed by the operation of transistor 22. In essence, when the anode of controlled rectifier 400 is negative with respect to its cathode, transistor 22 produces an inhibiting signal at its collector which renders NPN transistor 350 conductive and thereby effectively shorts the input to the blocking oscillator. Under these conditions, irrespective of the signals applied by triggering source 11, no operative triggering pulse can be applied to the blocking oscillator 366 and consequently, no triggering impulse can be applied between the gate and cathode electrodes of controlled rectifier 400. The unique means of establishing this inhibiting signal to initiate shorting the input of the blocking oscillator will be considered in conjunction with the illustrative waveforms shown in FIGURE 2.

Several significant points in the circuit have been represented by the letters A through E. The four waveforms shown in FIGURE 2 represent the instantaneous voltage values occurring at these points during a typical cycle of operation. The waveforms $e_A$, $e_B$, $e_C$ depict the instantaneous voltage with respect to the cathode of controlled rectifier 400, and waveform $e_E$ depicts the voltage with respect to ground. Thus, it will be seen that voltage waveform $e_A$ is a sinusoid representing the output of alternating current generator 10. As shown in the FIGURE 2, the volt-seconds of the positive portion of this waveform are less than those of the negative portion. This indicates the presence of a negative DC level. A DC component may also be present as a result of chunks taken out of the wave shape by conduction of controlled rectifiers such as 400, 404 or ones in other parts of the equipment. The voltage represented by waveform $e_A$ is applied via rectifier 24 and resistor 23 to the dotted terminal of transformer 14. Rectifier 24 is effective to half-wave rectify the voltage and the instantaneous voltage appearing at the cathode of rectifier 24, point B, represents the positive portion of waveform $e_A$ only. In other words, waveform $e_B$ is at zero volts until the point at which the applied voltage $e_A$ crosses the zero potential in a positive direction, and thereafter it remains positive until the applied voltage $e_A$ crosses the zero voltage level in a negative direction at which time it becomes zero once again. The identity of the crossing points is thus established as a sudden change in the slope of the waveform $e_B$.

The pulses in the wave shape $e_B$ carry with them intelligence which shows the exact time that the applied wave $e_A$ was positive. This voltage is applied through the large resistance 23 to linear transformer 14. The exciting current of this transformer is designed to be very low, thus, as voltage $e_B$ increases in a positive direction it appears almost entirely across the primary 15 of transformer 14 prior to being limited by the emitter-base diode of transistor 22. Instantaneous voltage waveform $e_C$ represents the voltage across the primary winding and shows a rising slope in conformity with that of the voltage $e_B$. If a 1:1 ratio is assumed between the windings 15 and 16 of transformer 14, a similar voltage is induced at the dotted terminal, point D, of secondary winding 16.

When the triggering potential of transistor 22 is reached, i.e., at a voltage of approximately 0.7 volt positive, the base-emitter impedance of transistor 22 drops to an extremely low value and thereby limits the voltage level on the dotted terminal of secondary winding 16 to this level for the remainder of the positive pulse of voltage $e_B$. At the end of the positive portion of voltage $e_B$, this voltage abruptly changes slope and becomes zero volts. This is effective to cause the flux in the transformer 14 to rapidly collapse. In turn, the negative pulse at 31, on waveform $e_C$, is produced. The resistor 18 and rectifier 17, connected across secondary winding 16, limit the magnitude of this negative spike and provide a sufficiently low impedance path to assure that the voltage across the transformer returns to zero before the next positive pulse of waveform $e_B$ is applied.

Considering the operation of transistor 22 during this cycle of operation it will be appreciated that initially it is nonconducting and the voltage at its collector resides at a positive level substantially equal to that of the voltage source 339. During the period that the anode of controlled rectifier 400 is positive with respect to its cathode, transistor 22 is rendered conductive and consequently, the collector potential is approximately equal to that of its emitter, which is grounded. Subsequently, upon reversal of the potential across controlled rectifier 400, transistor 22 resumes its nonconducting state and the voltage at its collector again returns to that of the positive voltage source. These voltage transitions are shown in the voltage waveform $e_E$.

Having generated this well defined control signal, it merely remains to introduce it as a control to shorting transistor 350 in order to insure that controlled rectifier 400 receives triggering impulses only during the period that the appropriate potentials occur across its terminals. Thus, resistor 21 couples the voltage appearing at the collector of transistor 22 to the base terminal of switching transistor 350.

The dashed lines shown in FIGURE 2 represent the modifications occurring in the waveforms when controlled rectifier 400 is in fact triggered during its enabled interval. In accordance with these dashed outlines, it will be seen that the final output wave from transistor 22 becomes positive when controlled rectifier 400 is fired and the voltage drop between its anode and cathode consequently go to nearly zero volts. This effect, therefore, provides a discrete indication of the exact instant of time at which the controlled rectifier is operated. Of course, if desired, means could be provided to block the effects of firing upon the control circuit.

Inasmuch as the output of coupling transformer 14 is fed directly into the base to emitter circuit of transistor 22 which limits the input voltage to the firing potential of approximately 0.7 of a volt, very few volt-seconds are accumulated in the transformer during the positive voltage pulse. Accordingly, a very small transformer may be utilized. On the other hand, the accuracy of determining the exact instant at which the applied voltage $e_A$ goes through the zero potential is excellent because the voltage $e_B$ substantially appears across transformer winding 15 until the transistor is fully conducting since the transformer is specifically designed to have a low exciting current.

The voltage sensing circuit shown in FIGURE 1 within dashed lines 30 will be seen to be a simple and unique means for sensing the voltage excursions across a component, the terminals of which are not related to a common potential point.

While the invention has been illustrated in conjunction with a firing circuit for controlled rectifiers, other applications will be obvious to those skilled in the art. It will, of course, be understood that it is not wished to be limited to the particular embodiment shown since modifications may be made in both the circuit arrangement and the elements employed and it is contemplated in the appended claims to cover any such modification as fall within the true spirit and scope of the invention.

What is claimed as new and desired to be secured by Letters Patent of the United States is:

A circuit for controlling the conduction of a switch applying an asymmetrical alternating voltage to a load comprising pulse generating means coupled to said switch to periodically trigger said switch into conduction, voltage sensing means coupled to said switch to detect the polarity of said alternating voltage, said voltage sensing means including a transformer having a primary and a secondary winding and designed to have a low exciting current, unidirectional current conducting means oriented to couple said voltage across the primary winding of said transformer when said voltage is of a given polarity, first switch means coupled to said secondary winding and triggered into conduction by the application of said voltage to said primary winding, and second switch means coupled to said pulse generating means and controlled by the conduction of said first switch means to enable pulses to be applied to said switch only when the voltage across said switch is of said given polarity, the conduction of said first switch means limiting the voltage which can be applied to said transformer.

References Cited

UNITED STATES PATENTS

| | | | |
|---|---|---|---|
| 2,088,474 | 7/1937 | Haller | 328—210 X |
| 2,933,672 | 4/1960 | Jones | 323—86 X |
| 3,018,383 | 1/1962 | Ellert | 307—88.5 |
| 3,127,522 | 3/1964 | Thorndyke | 307—88.5 |
| 3,187,198 | 6/1965 | Lewis | 307—88.5 |
| 3,217,310 | 11/1965 | Pearson et al. | 340—248 |
| 3,244,964 | 4/1966 | Greening et al. | 323—22 |

ARTHUR GAUSS, *Primary Examiner.*

JOHN ZAZWORSKY, *Assistant Examiner.*